(12) United States Patent
Cetta et al.

(10) Patent No.: US 11,564,778 B2
(45) Date of Patent: Jan. 31, 2023

(54) ORTHODONTIC ELASTIC ATTACHMENTS FOR USE WITH DENTAL ALIGNERS

(71) Applicant: TH!NK Innovations, LLC, Moorestown, NJ (US)

(72) Inventors: Christopher N. Cetta, St. Petersburg, FL (US); Richard A. Kaye, Moorestown, NJ (US)

(73) Assignee: TH!NK Innovations, LLC, Moorestown, NJ (US)

( * ) Notice: Subject to any disclaimer, the term of this patent is extended or adjusted under 35 U.S.C. 154(b) by 283 days.

(21) Appl. No.: 16/380,851

(22) Filed: Apr. 10, 2019

(65) Prior Publication Data
US 2019/0274788 A1  Sep. 12, 2019

Related U.S. Application Data

(63) Continuation-in-part of application No. 29/639,669, filed on Mar. 7, 2018, now Pat. No. Des. 859,663.

(51) Int. Cl.
*A61C 7/08* (2006.01)
*A61C 7/30* (2006.01)
(Continued)

(52) U.S. Cl.
CPC ............... *A61C 7/303* (2013.01); *A61C 7/08* (2013.01); *A61C 7/14* (2013.01); *A61C 7/36* (2013.01)

(58) Field of Classification Search
CPC .. A61C 7/303; A61C 7/14; A61C 7/16; A61C 7/36; A61C 7/08; A61C 7/28;
(Continued)

(56) References Cited

U.S. PATENT DOCUMENTS 3,922,787 A * 12/1975 Fischer .................... A61C 7/12
433/8
4,243,386 A * 1/1981 Kawaguchi ............. A61C 7/16
433/9
(Continued)

FOREIGN PATENT DOCUMENTS

KR   200461607 Y1 * 7/2012
WO   WO 2016/115122  * 7/2016 ............... A61C 7/28

OTHER PUBLICATIONS

Dictionary.com, Bevel, Jun. 15, 2021 (Year: 2021).*
(Continued)

*Primary Examiner* — Heidi M Eide
(74) *Attorney, Agent, or Firm* — Carr & Ferrell LLP

(57) ABSTRACT

Provided herein are exemplary orthodontic elastic attachments that are customized to fit within the cutout windows of dental aligners, thus improving adhesion and minimizing inadvertent detachment from the tooth surface. The unique base pads are designed to have a shape that complements the present shape of the cutout windows like a puzzle piece. To improve adhesion to the tooth surface, the base pad may have its surface area maximized within the cutout windows. Also for improved adhesion, the base pad may be contoured to the dental anatomy of the tooth at the gumline for an intimate fit. Further exemplary embodiments may include the base pad having beveled edges to permit the aligner to slide over the base pad if it is adhered slightly off-center.

14 Claims, 10 Drawing Sheets

(51) Int. Cl.
*A61C 7/14* (2006.01)
*A61C 7/36* (2006.01)

(58) Field of Classification Search
CPC .. A61C 7/146; A61C 7/06; A61C 7/12; A61C 7/18; A61C 7/282; A61C 7/145; A61C 7/002
USPC .......................................... 433/18, 19, 9, 8
See application file for complete search history.

(56) References Cited

U.S. PATENT DOCUMENTS

| | | | |
|---|---|---|---|
| 5,055,039 A * | 10/1991 | Abbatte | A61C 7/08 433/24 |
| 5,183,388 A | 2/1993 | Kumar | |
| 5,230,619 A * | 7/1993 | Wong | A61C 7/12 433/9 |
| 5,607,299 A * | 3/1997 | Nicholson | A61C 7/14 433/3 |
| 6,036,488 A | 3/2000 | Williams | |
| 6,418,933 B1 | 7/2002 | Strong | |
| 6,702,575 B2 | 3/2004 | Hilliard | |
| 7,018,202 B2 | 7/2006 | Hilliard | |
| 7,077,646 B2 | 7/2006 | Hilliard | |
| 7,578,672 B2 | 8/2009 | Sheikh et al. | |
| D641,476 S | 7/2011 | Sibhatu et al. | |
| 7,987,854 B2 | 8/2011 | Arni | |
| D685,098 S | 6/2013 | Tompkins | |
| 9,237,941 B2 | 7/2016 | Mohr | |
| 9,393,085 B2 | 7/2016 | Mohr | |
| 9,993,317 B2 * | 6/2018 | Kottemann | A61C 7/36 |
| 10,136,964 B2 * | 11/2018 | Borovinskih | A61C 7/002 |
| D859,663 S | 9/2019 | Cetta et al. | |
| 10,456,219 B2 | 10/2019 | Buddemeyer et al. | |
| D910,191 S | 2/2021 | Cetta et al. | |
| 2003/0113682 A1 * | 6/2003 | Pospisil | A61C 7/282 433/17 |
| 2006/0234180 A1 | 10/2006 | Huge et al. | |
| 2009/0032030 A1 | 2/2009 | Callender | |
| 2010/0092905 A1 * | 4/2010 | Martin | A61C 7/00 433/18 |
| 2010/0209866 A1 * | 8/2010 | Pitnick | A61C 7/36 433/9 |
| 2013/0089828 A1 * | 4/2013 | Borovinskih | A61C 7/08 433/6 |
| 2013/0323664 A1 * | 12/2013 | Parker | A61C 7/20 433/6 |
| 2014/0178829 A1 * | 6/2014 | Kim | A61C 7/02 433/3 |
| 2014/0272758 A1 * | 9/2014 | Mohr | A61C 7/36 433/19 |
| 2014/0335468 A1 * | 11/2014 | Dickerson | A61C 7/36 433/19 |
| 2015/0216628 A1 * | 8/2015 | TenBrook | A61C 7/14 433/8 |
| 2015/0238284 A1 * | 8/2015 | Wu | A61C 7/002 433/19 |
| 2015/0245888 A1 * | 9/2015 | Hasegawa | A61C 7/08 433/19 |
| 2016/0199154 A1 * | 7/2016 | Schlimper | A61C 7/145 433/9 |
| 2016/0287356 A1 * | 10/2016 | Bernstein | A61C 7/282 |
| 2018/0042701 A1 * | 2/2018 | Kim | A61C 7/08 |
| 2018/0153643 A1 | 6/2018 | Lambert | |
| 2019/0090985 A1 * | 3/2019 | Jo | A61C 5/007 |

OTHER PUBLICATIONS

Cetta et al., "A Reimagined Button for Elastic Attachment to Clear Aligners," Journal of Clinical Orthodontics, vol. LIII, No. 4, Apr. 2019, 2 pages.

* cited by examiner

ORTHODONTIC ELASTIC ATTACHMENTS FOR USE WITH DENTAL ALIGNERS

CROSS REFERENCE TO RELATED APPLICATIONS

This continuation in part application claims the priority benefit of U.S. Design application Ser. No. 29/639,669 filed on Mar. 7, 2018 and titled "Orthodontic Elastic Attachment," which is hereby incorporated by reference in its entirety.

FIELD OF THE TECHNOLOGY

The present technology relates generally to dental aligners as used in orthodontics.

SUMMARY OF THE PRESENT TECHNOLOGY

Provided herein are exemplary embodiments may include an orthodontic elastic attachment with a unique base pad customized for the anatomy of a molar tooth. The base pad complements the shape of the aligner cutout windows for the molar. Additionally, the base pad has a maximized surface area within this cutout window for improved adhesion. The base pad is contoured to the dental anatomy of the molar at the gumline, or gingival one-third of the crown, for an intimate fit and improved adhesion to the tooth surface. The base pad may have an integral mechanical locking base, adhesive vents, and beveled edges that permit the plastic aligner to slide over if it were adhered slightly off-center. Attached to the base pad is a button stem and button head with a positioning groove on the button face.

Further exemplary embodiments may include an orthodontic elastic attachment with a base pad customized for the unique anatomy of a canine tooth. The base pad complements the shape of the aligner cutout windows for the canine tooth. Additionally, the base pad has a maximized surface area within this cutout window for improved adhesion. The base pad is contoured to the dental anatomy of the canine at the gumline, or gingival one-third of the crown, for an intimate fit and improved adhesion to the tooth surface. The base pad may have an integral mechanical locking base, adhesive vents, and beveled edges that permit the plastic aligner to slide over if it were adhered slightly off-center. Attached to the base pad is a button stem and button head with a positioning groove on the button face.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
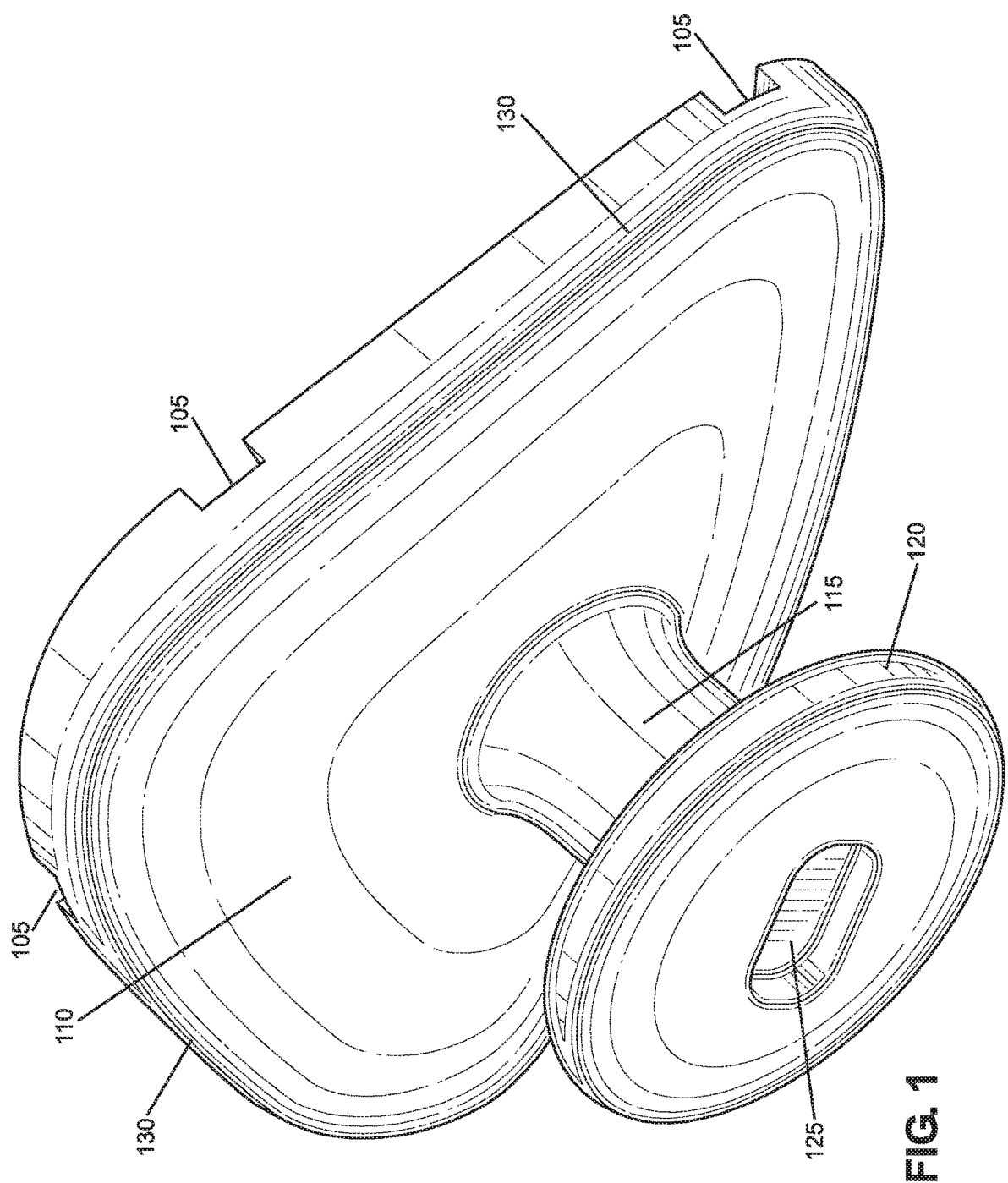
FIG. 1 is an oblique view of an exemplary embodiment of an orthodontic elastic attachment for a molar.

Clear aligners are orthodontic devices that are used to straighten teeth as an alternative to dental braces. These removable plastic trays are customized to an individual's teeth and apply incremental pressure as they are worn and periodically changed. Although aligners are produced by several manufacturers, Invisalign® by Align Technology, Inc. is the most prominent brand.

While aligners themselves may straighten teeth, they do not align the bite. Dental elastics may be used in conjunction with either braces or aligners to treat malocclusion, or a misaligned bite. While elastics may be worn with braces by attaching to the brackets or archwires, aligners can require attachments to be adhered to specific teeth to accommodate elastic wear.

Currently, there are several attachment options available for elastic wear with clear aligners. These attachments are typically adhered directly to the teeth within a cutout window in the plastic aligner. The cutout window is positioned at the gumline, referred to as the gingival or cervical one-third of the crown. Since the existing attachment options were developed for traditional braces, they were intended to fit at the center of the crown. Additionally, many of these attachment options were not designed to support the force of rubber bands between the upper and lower jaw, called interarch dental elastics. Inappropriately adapting these attachments for use with clear aligners has resulted in their detachment from the tooth surface, difficulty for patients in securing the elastic bands, or even discomfort for the patient in terms of irritation to the cheeks and gums. Ultimately these design shortcomings result in unnecessary emergency visits back to the orthodontist's or dentist's office.

Metal braces are made of stainless steel and are purposely designed to fit the center of each crown, not in the gingival one-third where aligner attachments must be placed. When positioned at the gumline, metal braces can dig into the gums, irritate the cheeks and become a trap for plaque. Because of their thickness, care must also be taken while chewing to avoid inadvertent detachment. Lastly, metal braces have components, such as an archwire tube, that are only necessary for braces and add to their manufacturing expense.

Metal buttons are stainless steel attachments that have mushroom-shaped projections for accommodating elastics. Metal buttons, in their current form, have miniature base pads which are improperly contoured to fit the tooth at the gumline. Consequently, their small surface area and improperly contoured base frequently lead to a poor fit and eventual detachment from the tooth.

Caplin hooks are another form of attachment comprised of stainless steel. Similar to metal buttons, Caplin hooks offer a miniature base pad that is improperly contoured for their use with dental aligners. Additionally, patients may have difficulty with the hook component that secures the elastic band, as it was never intended for interarch dental elastics.

Composite resin buttons are also mushroom-shaped attachments, but made of dental plastic resin. While having the advantage of being esthetic, the plastic material frequently abrades or chips away over time while the button head can be bulky and difficult to clean around. Composite resin buttons similarly have a minimal size base and are prone to detachment issues.

Porcelain ceramic buttons, in their current form, are frequently lost due to the size of their small base, which also lacks the proper contour for placement at the gumline.

Lastly, some aligner manufacturers offer prefabricated notches in their plastic trays for securing the elastic bands directly to the aligners themselves. These slits are often referred to as hooks. Since the hooks are shaped from the actual plastic aligner, the force from the elastic bands often pops the aligners off the teeth when they are in the mouth. If they do stay in place, the plastic dovetail that is formed by the notch can bend outward and irritate the cheeks.

The exemplary embodiments described and illustrated herein include orthodontic elastic attachments with a unique base pad optimized for dental aligner technology.

The base pad has a shape that complements the shape of the plastic window such that it fits within the aligner's cutout like a puzzle piece. Presently, these cutout windows resemble semi-circles, but the exemplary embodiments herein may include additional variations.

The surface area of the base pad is maximized within the cutout windows to create an optimal surface area for tooth adhesion. This increased bond strength reduces unintended detachment from elastic or masticatory forces.

Furthermore, the base pad is specially contoured to fit the tooth's unique shape along the gumline, not at the center of the crown like the existing brackets and attachment options.

The base pad features beveled edges, so if it is adhered to the tooth slightly off-center, it will not prevent the plastic aligner from seating or fitting completely on the teeth.

Secured to the base pad is a mushroom-shaped button for securing elastics, but may also be a hook or any other fastening method. Alternatively, the base pad can incorporate an archwire tube, if partial braces are required to supplement the plastic aligners. The base pad may also be used as an alternative to traditional orthodontic bands for the integration of welded or soldered orthodontic appliances with the plastic aligners. By incorporating the base pad into appliance fabrication such as a trans-palatal or a lingual arch, the base pad may be used for alternative purposes such as, but not limited to, erupting impacted teeth or rotating adjacent teeth.

These novel attachments can be made specific to fit the unique dental anatomy of any tooth, whether it be the molar, canine or premolar. It may be comprised of stainless steel, porcelain, composite resin, gold or any other material known in the field of dentistry.

Dental professionals are utilizing clear aligner therapy more and more each year as an alternative to traditional braces. However, aligners alone do not address the patient's bite; dental elastics are necessary. Currently, existing attachments to accommodate elastic wear during aligner therapy do not follow the proper contour of the tooth at the gumline and have a limited surface area for attachment retention to the tooth. Therefore, these components frequently detach, become irritating, and are difficult to clean.

The exemplary embodiments described and illustrated herein are made to be used in conjunction with plastic dental aligners, its design taking into consideration the failure of the currently available options. The innovative base pad is shaped to fit the aligner cutout, has a maximized surface area for adhesion to various teeth, and is contoured to follow the tooth's anatomical features at the gumline. All components attached to the base pad are smooth and non-irritating to the cheeks and gums. These unique features will greatly reduce unnecessary emergency appointments that are frustrating to both the patient and doctor.

FIG. 1 is an oblique view of an exemplary orthodontic elastic attachment.

Shown in FIG. 1 are adhesive vents 105, base pad 110, button stem 115, button head 120, positioning groove 125, and beveled edges 130.

Figure 8:
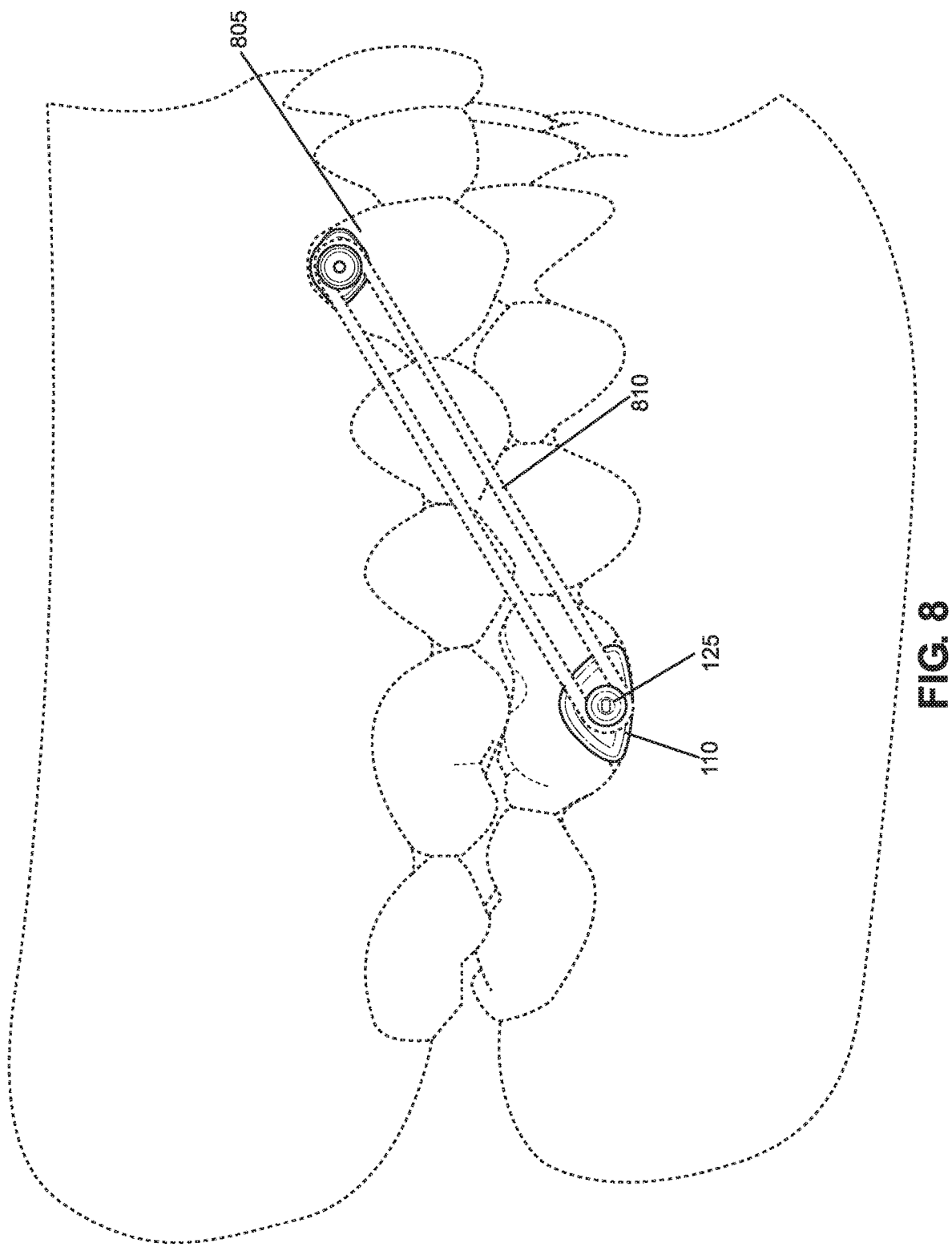
FIG. 8 is a facial view with elastic attachments specific for the molar and the canine applied to the appropriate teeth within the cutout windows of the aligners. An elastic band embodiment is connected between the canine and molar attachments thereof.

In some exemplary embodiments, the adhesive vent 105 may permit excess dental bonding resin to express out. The button stem 115 may secure a rubber band such as an interarch dental elastic 810 (FIG. 8). The button head 120 retains the elastic band. The positioning groove 125 may allow for positioning of the base pad 110 on the tooth with a dental explorer or scaler instrument.

Figure 2:
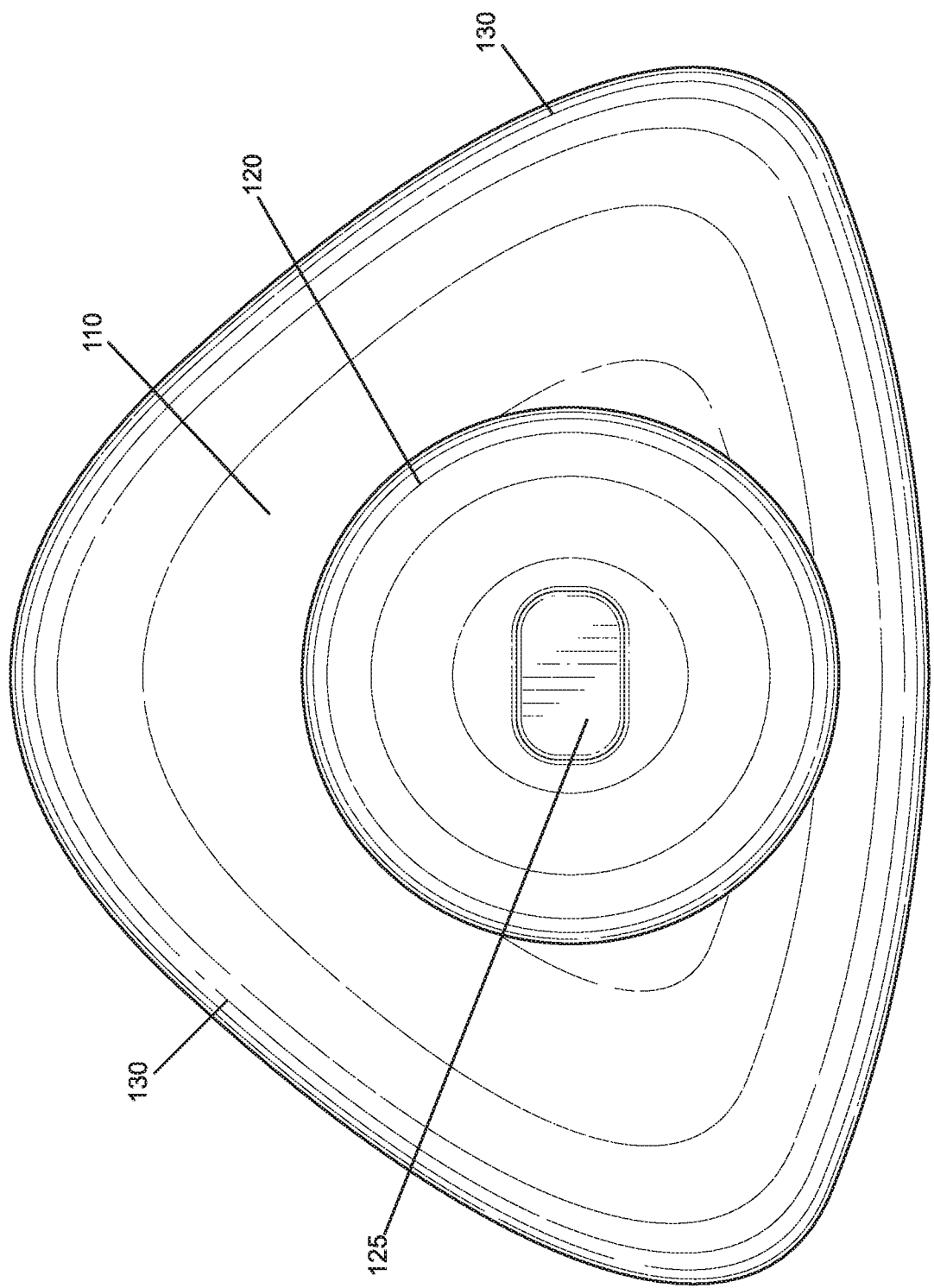
FIG. 2 is a facial view thereof.

FIG. 2 is a facial view of an exemplary orthodontic elastic attachment.

Shown in FIG. 2 (facing out from the tooth surface) are base pad 110 (FIG. 1), button head 120 (FIG. 1), positioning groove 125 (FIG. 1), and beveled edges 130 (FIG. 1).

Figure 3:
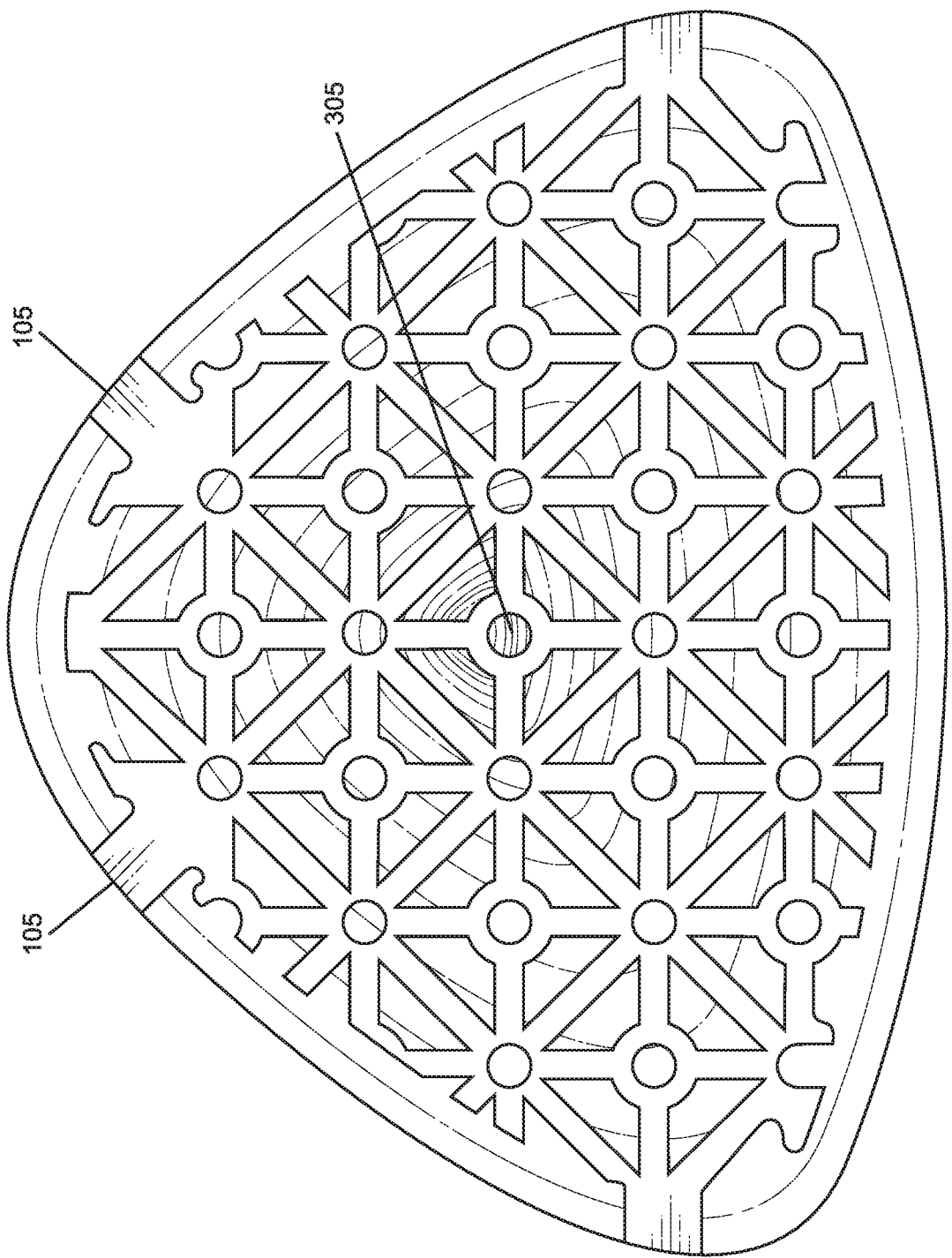
FIG. 3 is a lingual view thereof.

FIG. 3 is a lingual view of an exemplary orthodontic elastic attachment.

Shown in FIG. 3 are adhesive vents 105 (FIG. 1) and an integral mechanical locking base 305. This represents the internal surface that presses against the tooth and is filled with a tooth glue, known dental bonding adhesive. The pattern on the back is called the integral locking base and provides locking mechanical retention for the adhesive 305. The adhesive vents 105 allow excess glue to express out.

Figure 4:
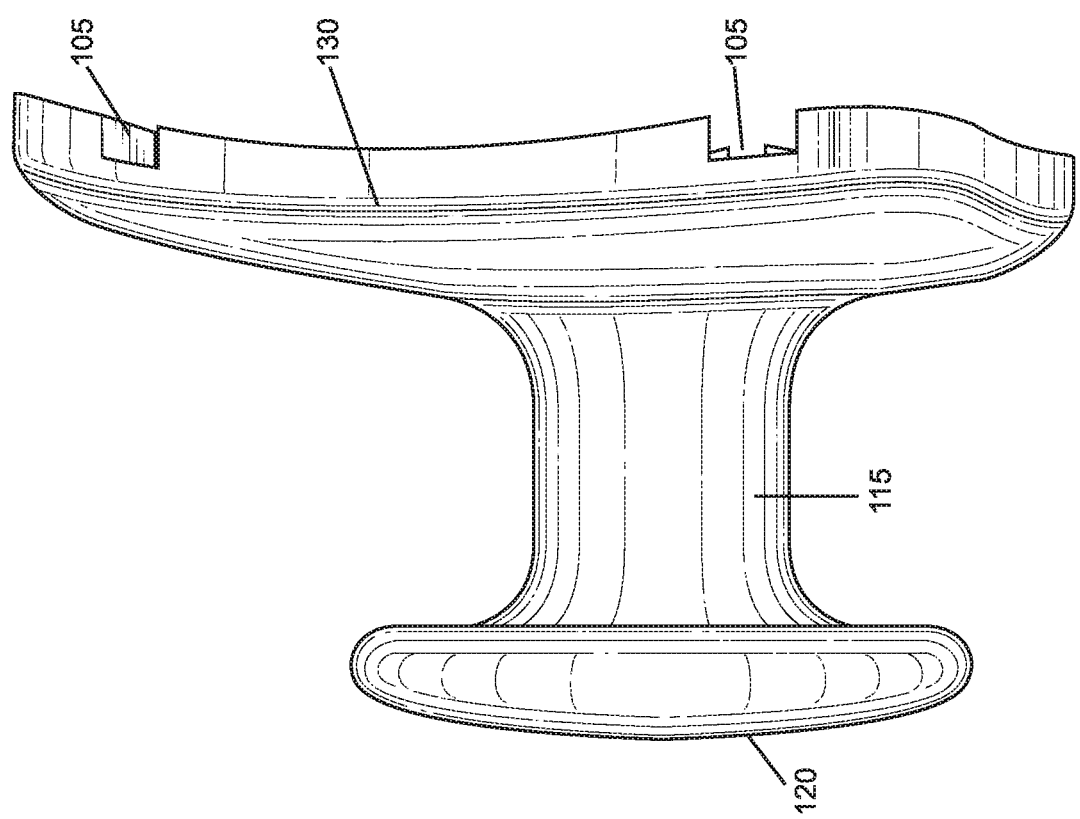
FIG. 4 is a mesial view thereof.

FIG. 4 is a mesial view of an exemplary orthodontic elastic attachment.

Figure 5:
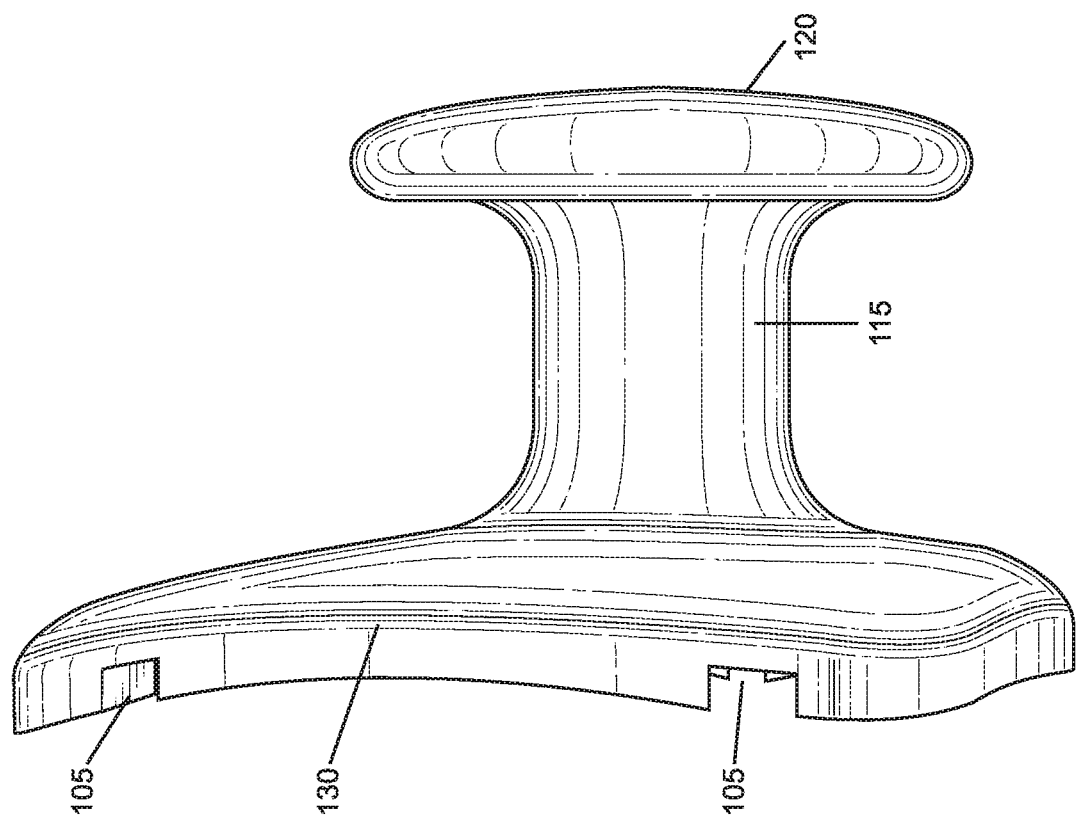
FIG. 5 is a distal view thereof.

FIG. 5 is a distal view of an exemplary orthodontic elastic attachment.

Shown in FIGS. 4-5 are adhesive vents 105 (FIG. 1), button stems 115 (FIG. 1), button heads 120 (FIG. 1), and beveled edges 130 (FIG. 1).

Figure 6:
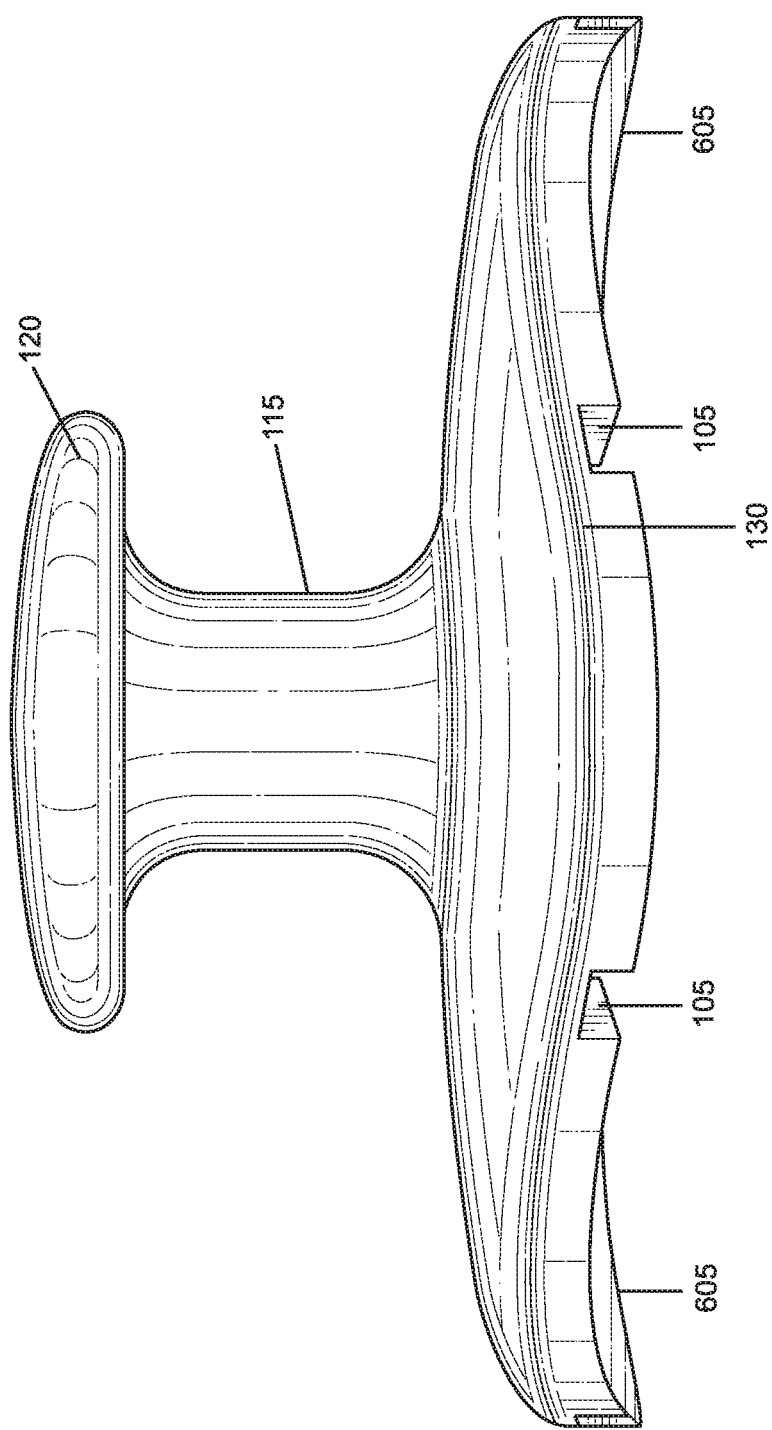
FIG. 6 is an occlusal view thereof.

FIG. 6 is an occlusal view of an exemplary orthodontic elastic attachment.

Shown in FIG. 6 are adhesive vents 105 (FIG. 1), button stem 115 (FIG. 1), button head 120 (FIG. 1), and beveled edge 130 (FIG. 1) and contouring of the base pad 605. The contouring of the base pad 605 allows it to fit ideally with the unique dental anatomy of the molar at the gumline. This improved adaptation of the base pad creates a more intimate fit and results in a very strong adhesion to the tooth surface, referred to as an increased bond strength.

Figure 7:
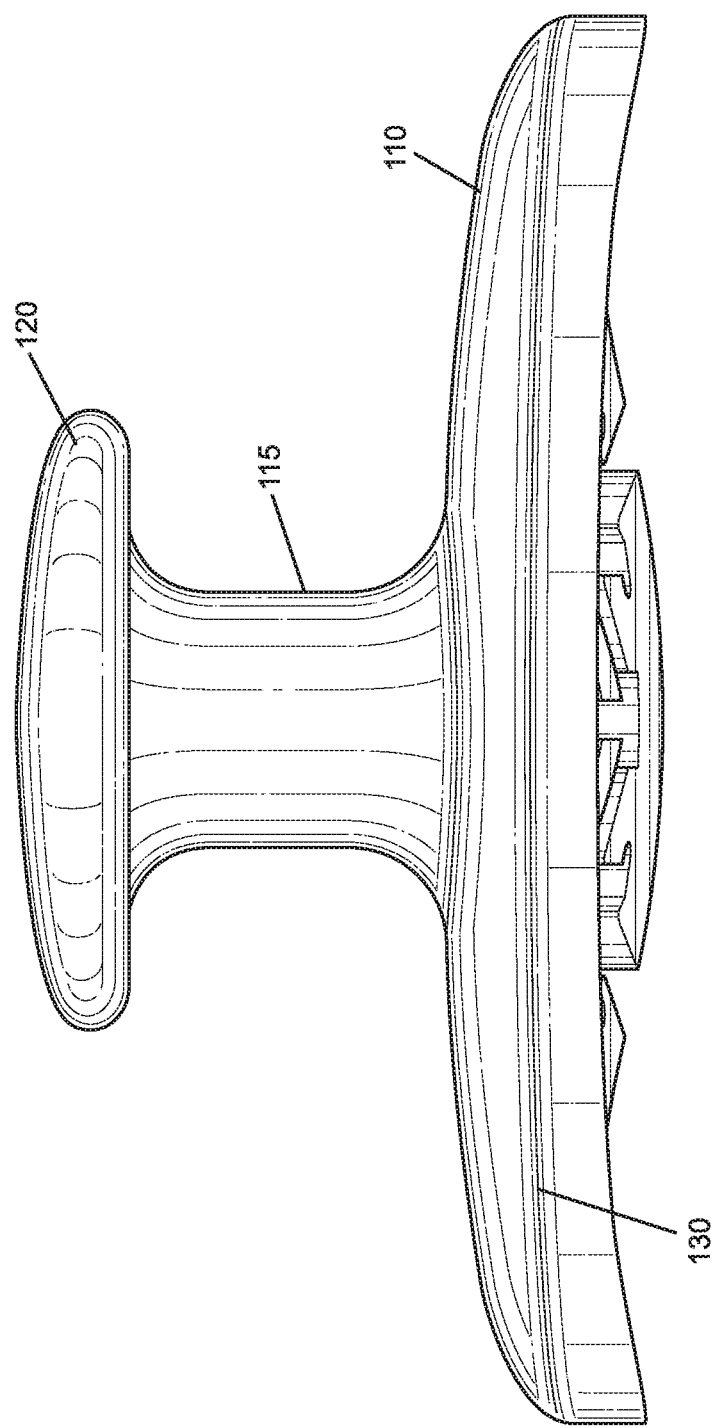
FIG. 7 is a gingival view thereof.

FIG. 7 is a gingival view of an exemplary orthodontic elastic attachment.

Shown in FIG. 7 are base pad 110 (FIG. 1), button stem 115 (FIG. 1), button head 120 (FIG. 1), and beveled edge 130 (FIG. 1).

FIG. 8 is a facial view of molar and canine embodiments as applied to the teeth within the cutout windows of the aligners and connected by an elastic band embodiment thereof.

Shown in FIG. 8 are base pad 110 (FIG. 1), positioning groove 125 (FIG. 1), a dental elastic 810, and a canine tooth 805.

Figure 9:
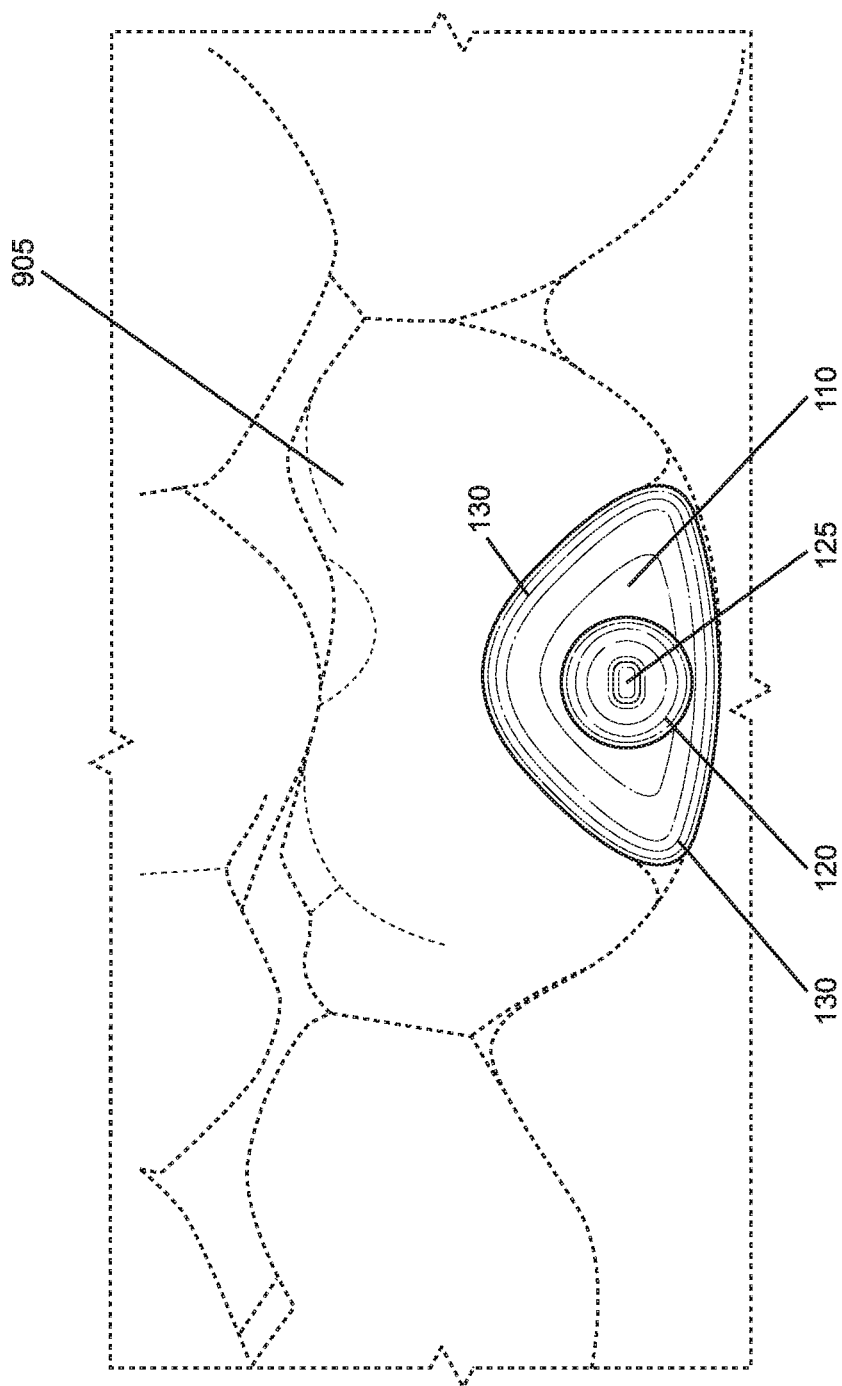
FIG. 9 is an alternative facial view showing the intimate fit between the aligner button, tooth surface, and the aligner cutout window thereof.

FIG. 9 is an alternative facial view showing the intimate fit between the aligner button, tooth surface, and the aligner cutout window thereof.

Shown in FIG. 9 are base pad 110 (FIG. 1), button head 120 (FIG. 1), positioning groove 125 (FIG. 1), beveled edges 130 (FIG. 1) and molar tooth 905.

In many exemplary embodiments, the base pad 110 is adhered to the tooth with a tooth glue known as dental bonding adhesive.

Figure 10A:
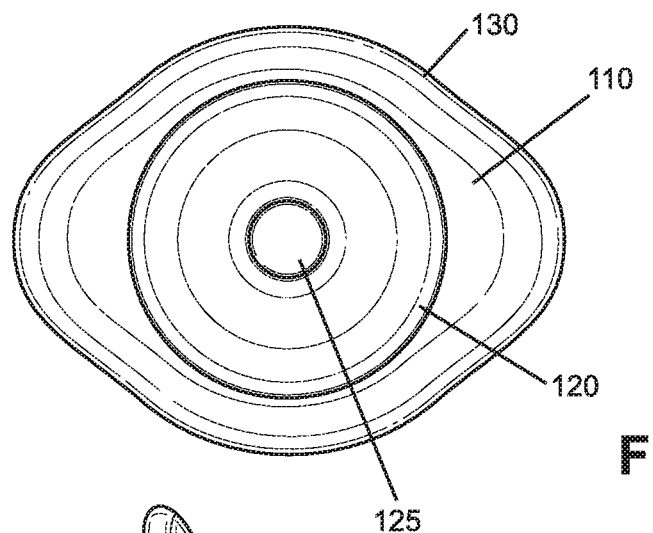
FIGS. 10A-10C shows various views of an orthodontic elastic attachment for a canine tooth.
Figure 10B:
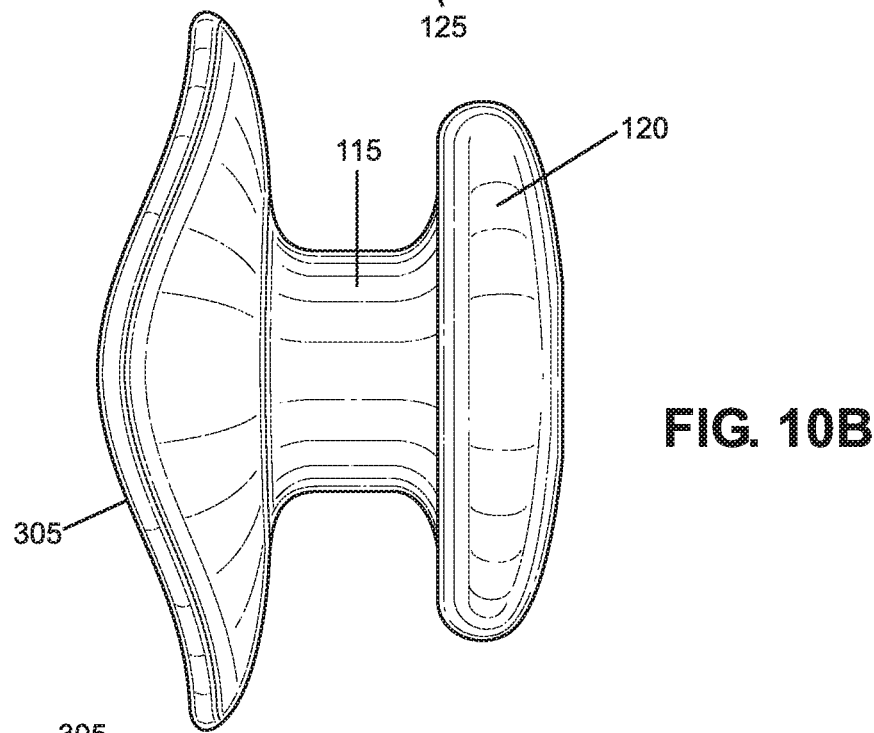
Figure 10C:
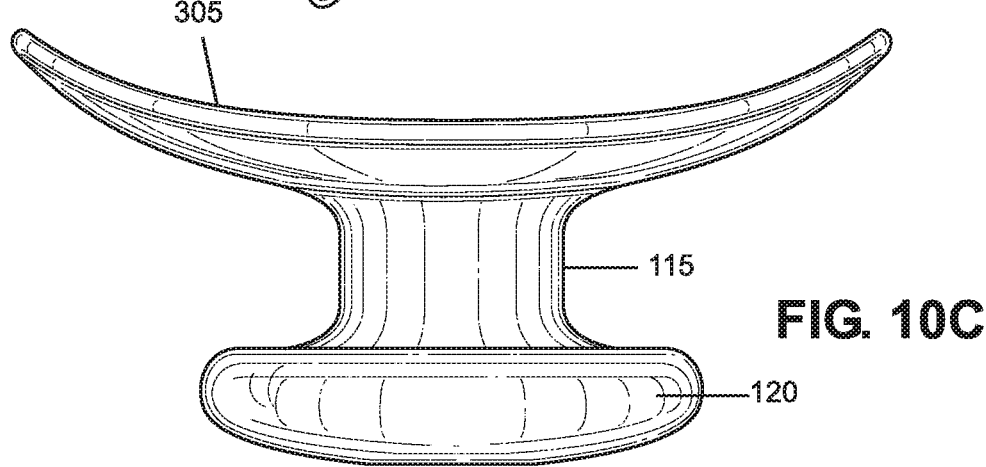

FIGS. 10A-10C shows various views of an orthodontic elastic attachment designed specifically for a canine tooth.

FIG. 10A is a facial view. FIG. 10B is a mesial and/or distal view. FIG. 10C is an occlusal and/or gingival view.

Shown in FIGS. 10A-10C are base pads 110 (FIG. 1), button stems 115 (FIG. 1), button heads 120 (FIG. 1), positioning groove 125 (FIG. 1), beveled edge 130 (FIG. 1), and an integral mechanical locking base 305.

Figure 11:
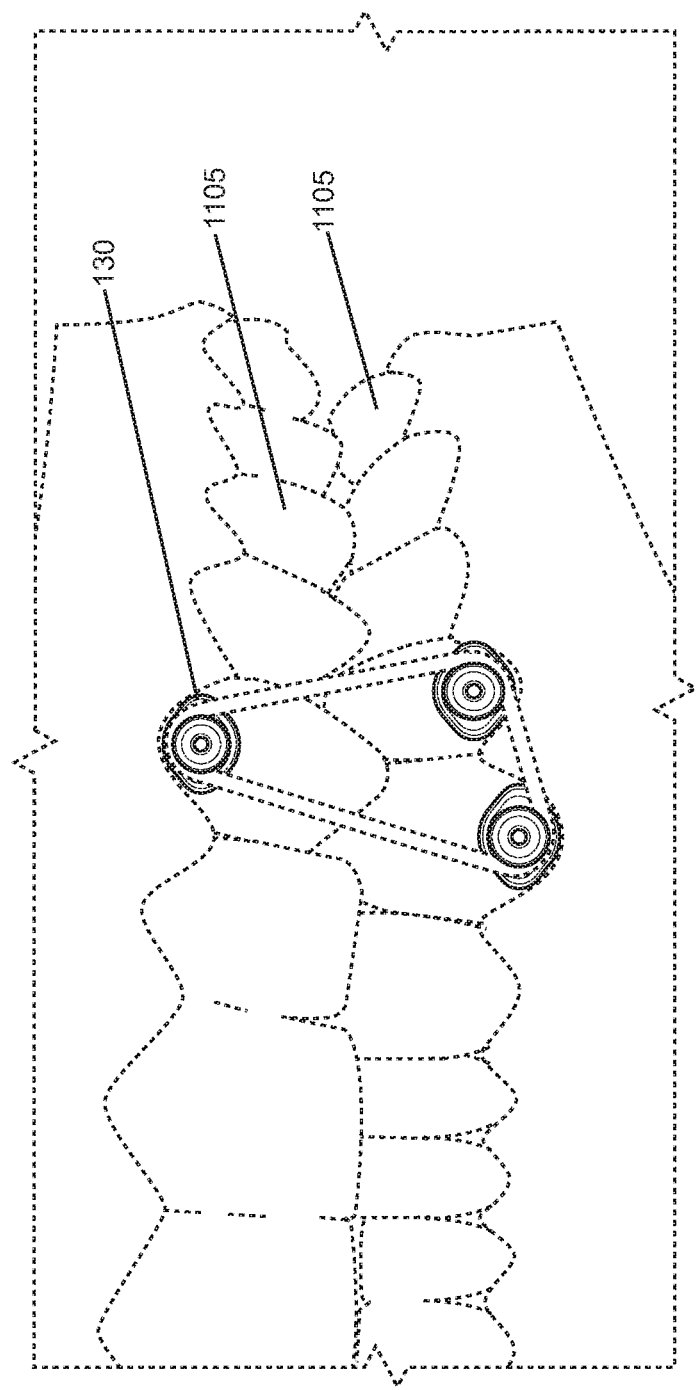
FIG. 11 shows a facial view of the orthodontic elastic attachments thereof as applied to the teeth within the cutout windows of the aligners. An elastic band embodiment is connected from the upper to the lower attachments thereof.

FIG. 11 shows orthodontic elastic attachments applied to the teeth within the cutout windows of the plastic aligners and connected by an elastic band.

Shown in FIG. 11 are beveled edge 130 (FIG. 1), and aligners 1105. This illustrates how the cutout windows are placed on the upper and lower canines or premolars.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system comprising:
an aligner having a cutout window; and
an orthodontic elastic attachment having:
  a base pad, the base pad being contoured to match a horizontal convexity of a tooth at a gumline when the base pad is flush against the tooth at the gumline of the tooth, allowing an intimate fit between the base pad, the horizontal convexity of the tooth, and the gumline of the tooth, the base pad configured for being in contact with the gumline;
  wherein the base pad is a shape fitting within the cutout window of the aligner like a puzzle piece and a surface area of the base pad is maximized within the cutout window of the aligner for improved adhesion to a surface of the tooth at the gumline;
  a button stem connected to the base pad; and
  a button head attached to a top of the button stem, the button head comprising a positioning groove on a face of the button head, the positioning groove allowing for positioning of the base pad at the gumline of the tooth using a dental explorer or scaler instrument.

2. The system of claim 1, wherein the base pad further comprises beveled edges, wherein the beveled edges permit the aligner to slide over the base pad if the orthodontic elastic attachment is adhered off-center.

3. The system of claim 2, wherein the base pad further comprises an integral mechanical locking base.

4. The system of claim 2, further comprising the base pad configured to attach to the tooth at the gumline with dental bonding adhesive.

5. The system of claim 1, wherein the tooth is a molar tooth;
wherein the shape of the base pad is a triangular shape with rounded vertices fitting within the cutout window of the aligner.

6. The system of claim 1, wherein the tooth is a canine tooth;
wherein the shape of the base pad is a diamond shape with rounded vertices fitting within the cutout window of the aligner.

7. The system of claim 1, wherein the tooth is a premolar tooth;
wherein the shape of the base pad is a diamond shape with rounded vertices fitting within the cutout window of the aligner.

8. The system of claim 1, wherein the orthodontic elastic attachment is made of stainless steel.

9. The system of claim 1, wherein the orthodontic elastic attachment is made of porcelain.

10. The system of claim 1, wherein the orthodontic elastic attachment is made of composite resin.

11. The system of claim 1, wherein the orthodontic elastic attachment is made of gold.

12. The system of claim 1, wherein the cutout window is a semi-circle shape.

13. A system comprising:
an aligner having a cutout window; and
an orthodontic elastic attachment having:
  a base pad, the base pad configured for attachment to a molar tooth, being contoured to match a horizontal convexity and a vertical convexity of the molar tooth at a gumline when the base pad is flush against the molar tooth at the gumline of the molar tooth, allowing for an intimate fit between the base pad, the horizontal convexity and the vertical convexity of the molar tooth, and the gumline of the molar tooth, the base pad configured for being in contact with the gumline;
  wherein the base pad is a triangular shape with rounded vertices fitting within the cutout window of the aligner like a puzzle piece and a surface area of the base pad is maximized within the cutout window of the aligner for improved adhesion to a surface of the molar tooth at the gumline;
  wherein the base pad further comprises beveled edges, wherein the beveled edges permit the aligner to slide over the base pad if the orthodontic elastic attachment is adhered off-center;
  a button stem connected to the base pad; and
  a button head attached to a top of the button stem, the button head comprising a positioning groove on a face of the button head, the positioning groove allowing for positioning of the base pad at the gumline of the molar tooth using a dental explorer or scaler instrument.

14. A system comprising:
an aligner having a cutout window; and
an orthodontic elastic attachment having:
  a base pad, the base pad being contoured to match a horizontal convexity of a canine tooth at a gumline when the base pad is flush against the canine tooth at the gumline of the canine tooth, allowing an intimate fit between the base pad, the horizontal convexity of the canine tooth, and the gumline of the canine tooth, the base pad configured for being in contact with the gumline;
  wherein the base pad is a diamond shape with rounded vertices fitting within the cutout window of the aligner like a puzzle piece and a surface area of the base pad is maximized within the cutout window of the aligner for improved adhesion to a surface of the canine tooth at the gumline;
  a button stem connected to the base pad; and
  a button head attached to a top of the button stem, the button head comprising a positioning groove on a face of the button head, the positioning groove allowing for positioning of the base pad at the gumline of the canine tooth using a dental explorer or scaler instrument.

* * * * *